US011604760B2

United States Patent
Ghosh et al.

(10) Patent No.: US 11,604,760 B2
(45) Date of Patent: Mar. 14, 2023

(54) DYNAMIC DETERMINATION OF RETENTION PERIODS FOR DIGITAL CONTENT

(71) Applicant: INTERNATIONAL BUSINESS MACHINES CORPORATION, Amonk, NY (US)

(72) Inventors: Partho Ghosh, Kolkata (IN); Saraswathi Sailaja Perumalla, Visakhapatnam (IN); Divya Mantha, Vizag (IN); Sunita Rani Nayak, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 39 days.

(21) Appl. No.: 17/203,730

(22) Filed: Mar. 16, 2021

(65) Prior Publication Data

US 2022/0300451 A1   Sep. 22, 2022

(51) Int. Cl.
*G06F 16/11* (2019.01)
*G06N 20/00* (2019.01)
(Continued)

(52) U.S. Cl.
CPC ............ *G06F 16/125* (2019.01); *G06F 16/14* (2019.01); *G06F 16/164* (2019.01);
(Continued)

(58) Field of Classification Search
CPC ...... G06F 16/125; G06F 16/14; G06F 16/164; G06F 40/205; G06N 20/00; H04L 51/08; H04L 51/42
(Continued)

(56) References Cited

U.S. PATENT DOCUMENTS 7,216,207 B1 * 5/2007 Armstrong-Crews ....................... G06F 21/80
 711/159
9,912,752 B1 * 3/2018 Davis .................. G06F 16/2365
(Continued)

FOREIGN PATENT DOCUMENTS

CN     110489384 A     11/2019
CN     112069377 A   * 12/2020
(Continued)

OTHER PUBLICATIONS

International Search Report and the Written Opinion dated Jun. 10, 2022, pp. 8, for Application No. PCT/CN2022/079544.
(Continued)

*Primary Examiner* — Ashish Thomas
*Assistant Examiner* — Abdullah A Daud
(74) *Attorney, Agent, or Firm* — Konrad Raynes Davda & Victor LLP; David W. Victor (57) ABSTRACT

Provided are a computer program product, system, and method for dynamic determination of retention periods for digital content. Metadata is generated for instances of digital content including an access pattern of the digital content by a user of the computing device, attributes of the digital content, and a retention period during which the digital content stored is retained in the storage. A machine learning module is trained with input comprising the metadata for instances of the digital content to produce the retention period of the digital content. Input, comprising metadata determined from digital content, received after training the machine learning module, is provided to the machine learning module to produce an output retention period for the digital content received after the training. The output retention period is used to determine when to delete the digital received after the training content from the storage.

17 Claims, 6 Drawing Sheets

(51) Int. Cl.
   *G06F 16/16* (2019.01)
   *G06F 16/14* (2019.01)
   *H04L 51/08* (2022.01)
   *G06F 40/205* (2020.01)
   *H04L 51/42* (2022.01)

(52) U.S. Cl.
   CPC ........... *G06F 40/205* (2020.01); *G06N 20/00* (2019.01); *H04L 51/08* (2013.01); *H04L 51/42* (2022.05)

(58) Field of Classification Search
   USPC .......................................................... 707/663
   See application file for complete search history.

(56) References Cited

U.S. PATENT DOCUMENTS

| | | | |
|---|---|---|---|
| 10,311,042 | B1 | 6/2019 | Kumar |
| 10,469,431 | B2 | 11/2019 | Arbajian et al. |
| 11,075,870 | B1 * | 7/2021 | Baez ....................... H04L 51/18 |
| 2008/0250084 | A1 | 10/2008 | Polimeni |
| 2015/0331881 | A1 | 11/2015 | Myles |
| 2016/0142350 | A1 * | 5/2016 | Mutha ..................... H04L 51/18 709/206 |
| 2016/0241494 | A1 | 8/2016 | Badge et al. |
| 2018/0032906 | A1 * | 2/2018 | Gangadharappa ..... G06N 5/025 |
| 2018/0184271 | A1 * | 6/2018 | Kumabe .................. H04W 4/40 |
| 2018/0191790 | A1 | 7/2018 | Kanzaki et al. |
| 2020/0076632 | A1 * | 3/2020 | Beloussov ........ H04M 15/8083 |
| 2021/0357451 | A1 * | 11/2021 | Wold ....................... G06F 40/30 |
| 2022/0166731 | A1 * | 5/2022 | Rey ....................... H04L 51/043 |

FOREIGN PATENT DOCUMENTS

| | | |
|---|---|---|
| CN | 112069377 A | 12/2020 |
| WO | 2004071035 A1 | 8/2004 |

OTHER PUBLICATIONS

Anonymous, "A Method for Recommending Digital Content to a Group based on Information Mined from One or More Sources", IP.com No. IPCOM000237422D, Jun. 18, 2014, 3 pp.

Anonymous, "A Push System for Content Based Identification and Deletion of Messages on Mobile Phones", IP.com No. IPCOM000243757D, Oct. 16, 2015, 5 pp.

\* cited by examiner

DYNAMIC DETERMINATION OF RETENTION PERIODS FOR DIGITAL CONTENT

BACKGROUND OF THE INVENTION

1. Field of the Invention

The present invention relates to a computer program product, system, and method for dynamic determination of retention periods for digital content.

2. Description of the Related Art

Portable computing devices, such as smartphones and tablets, have limited storage capacity. Portable computing devices often have installed file sharing applications, chatting applications, social media applications, etc. that receive and transmit messages with attached digital content, such as pictures, video, web pages, etc. The portable computing device storage may become fully utilized as the file attachments received with messages proliferate. Further, attached cloud storage may also reach capacity limits as digital media files are added. Users upon noticing storage is reaching a critical level may then have to manually start deleting files to free space, which can be very time consuming and an overall unpleasant user experience.

There is a need in the art for improved techniques for managing retention of files in storage, such as digital media files received through messages and file sharing applications.

SUMMARY

Provided are a computer program product, system, and method for dynamic determination of retention periods for digital content. Metadata is generated for instances of digital content stored in the computing device, including an access pattern of the digital content by a user of the computing device, attributes of the digital content, and a retention period during which the digital content stored is retained in the storage. A machine learning module is trained with input comprising the metadata for instances of the digital content to produce the retention period of the digital content. Input, comprising metadata determined from digital content, received after training the machine learning module, is provided to the machine learning module to produce an output retention period for the digital content received after the training. The output retention period is used to determine when to delete the digital received after the training content from the storage.

DETAILED DESCRIPTION

Described embodiments provide improvements to computer technology for managing retention of digital content received at a computing device, such as a portable computing device, in a storage of the computing device. As file sharing proliferates through message applications and file sharing applications, local and cloud storage used by the portable computing device receiving the communications may reach storage capacity limits. Described embodiments provide improved techniques for assigning retention periods to digital content, including to multiple instances of digital content attached to a message, based on access patterns and attributes of the digital content. In described embodiments, a retention machine learning module is trained with input comprising metadata for digital content in a training set of digital content to produce as output the retention duration of the digital content. Subsequently, upon receiving digital content, such as through messages and file sharing, the retention machine learning module may be used to determine the retention period for the digital content based on digital content metadata and a classification of the digital content. The determined retention period may then be used to determine when to expire and delete the digital content. In this way, the user does not have to regularly manually delete files received in communications because retention periods may be assigned to received digital content using the retention machine learning module that is based on metadata and classifications of the digital content.

Figure 1:
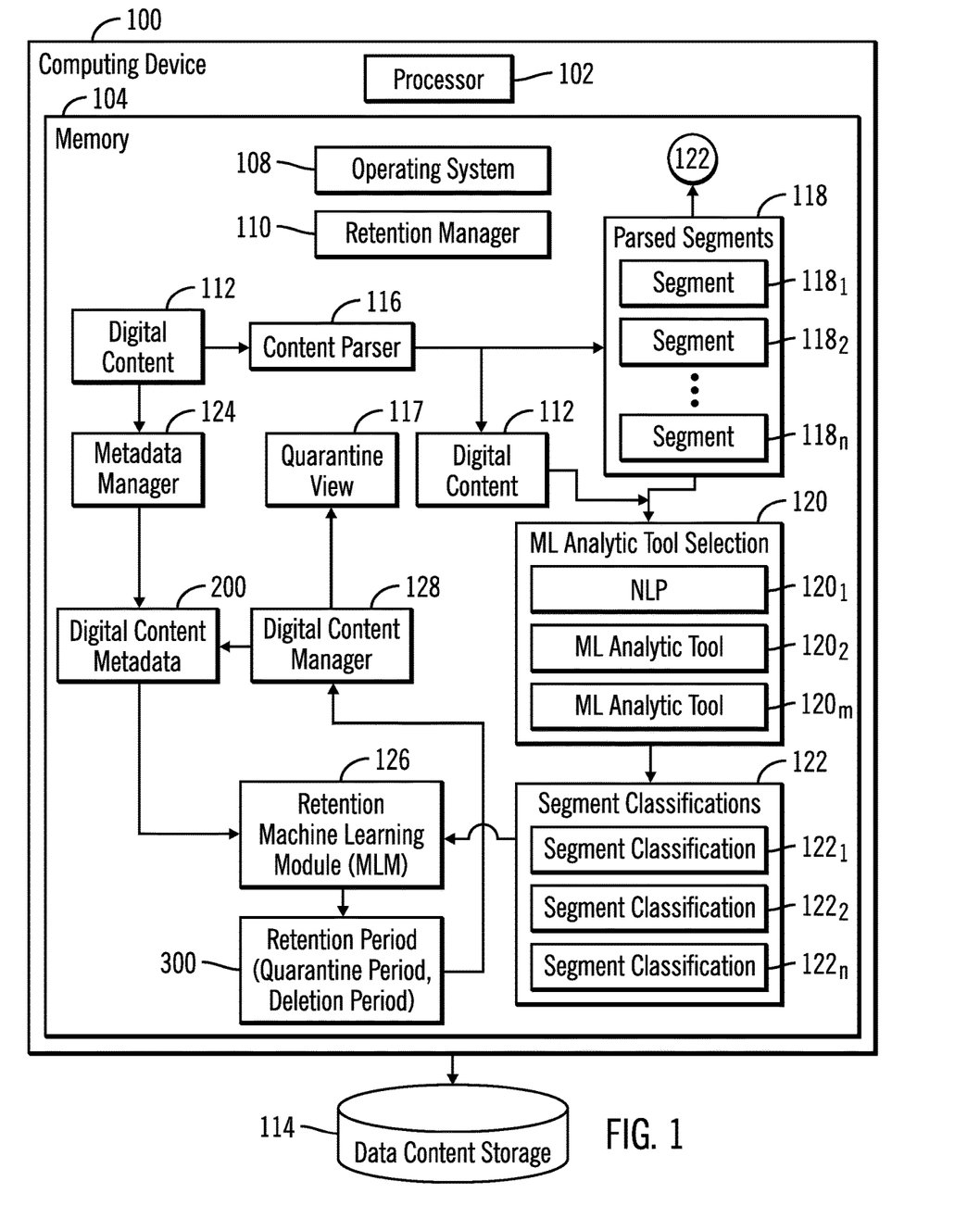
FIG. 1 illustrates an embodiment of a computing device in which digital content is managed.

FIG. 1 illustrates a computing device 100 in which embodiments are implemented. The computing device 100 includes a processor 102 and a main memory 104. The main memory 104 includes various program components and data structures including: an operating system 108 to manage system 100 operations and flow of operations among the components; a retention manager 110 to manage the overall flow of operations to determine a retention period to retain and store received digital content 112 in a digital content storage 114. The retention manager 110 provides the received digital content 112 to a content parser 116 to parse the content into parsed segments $118_1$, $118_2$ . . . $118_n$, comprising different files or parts of the digital content 112, if the digital content has parsed segments $118_i$. For instance, if the digital content 112 comprises a message, the message may have one or more attachments of different files in different media formats. The message and attached files comprise the parsed segments $118_1$, $118_2$ . . . $118_n$. Additionally, the digital content 112 may comprise a compressed file having multiple segments 118 or different files.

The parsed segments 118 or single digital content 112 file is provided to a machine learning (ML) analytic tool selection module 120 that selects an ML analytic tool $120_1$, $120_2$ . . . $120_m$ capable of annotating and classifying the content of the provided digital content 112 or parsed segments 118. For instance, if the segment $118_i$ or digital content 112 is comprised of text, then the ML analytic tool $120_1$ may comprise a natural language processor (NLP), such as by way of example, the Watson™ Natural Language Processor program, that determines classifications of the input segment $118_i$ or digital content 112. For other types of media format, different ML analytic tools $120_2 \ldots 120_m$ and classification programs may be used to classify the digital content 112 or segment $118_i$ from different media formats, e.g., still image, video, audio, etc., into one or more classifiers, such as image and video analytics, deep learning. The result of the ML analytic tool selection 120 are the segment classifications 122 comprising one or more segment classifications $122_1, 122_2 \ldots 122_n$ that provides a machine learning classification of the content of the parsed segments $118_1, 118_2 \ldots 118_n$ or digital content 112. The classifications $122_1, 122_2 \ldots 122_n$ may comprise a hashtag, text or other classification code. (Watson is a trademark of International Business Machines Corporation throughout the world).

The digital content 112 is further provided to a metadata manager 124 to generate digital content metadata 200 (FIG. 2) for a single digital content 112 or a metadata instance $200_i$ for each of the parsed segment $118_i$. The segment classifications $122_1, 122_2 \ldots 122_n$ and the digital content metadata 200, one for each segment $118_i$, are provided as input to a retention machine learning module (MLM) 126 to produce as output a retention period 300 for the digital content 112, or one retention period for each segment $118_i$.

The retention period 300 (FIG. 3) may be comprised of a quarantine period 304 and a deletion period 306 components. The quarantine period 304 refers to a period-of-time from when the digital content 112 was received, such that after expiration of the quarantine period 304, the digital content 112/segment $118_i$ is indicated in quarantine. The deletion period 306 refers to a period-of-time from when the digital content 112 was quarantined, such that after expiration of the deletion period 306, the quarantined digital content 112/segment $118_i$ is deleted and removed from the storage 114. The digital content 112/segment $118_i$ in quarantine may be presented to a user of the computing device 100 in a quarantine view 117 comprising a graphical user interface (GUI) in which the user can select to delete digital content 112/segment $118_i$ from the storage 114 or remove from the quarantine to retain in storage 114.

A digital content manager 128 manages access to the digital content 112/segment $118_i$ to determine when to update metadata 200, and retrain the retention MLM 126 based on a training set of digital content metadata 200.

The memory 104 may comprise non-volatile and/or volatile memory types, such as a Flash Memory (NAND dies of flash memory cells), a non-volatile dual in-line memory module (NVDIMM), DIMM, Static Random Access Memory (SRAM), ferroelectric random-access memory (FeTRAM), Random Access Memory (RAM) drive, Dynamic RAM (DRAM), storage-class memory (SCM), Phase Change Memory (PCM), resistive random access memory (RRAM), spin transfer torque memory (STM-RAM), conductive bridging RAM (CBRAM), nanowire-based non-volatile memory, magnetoresistive random-access memory (MRAM), and other electrically erasable programmable read only memory (EEPROM) type devices, hard disk drives, removable memory/storage devices, etc. The storage 114 may comprise a suitable non-volatile storage or memory device, including those non-volatile memory devices mentioned above.

In an alternative embodiment, the storage 114 may comprise a cloud storage having a maximum capacity, such that the user wants to limit retention of digital content to avoid the cloud storage account from reaching its maximum storage capacity.

The user computing device 100 may comprise a personal computing device, such as a laptop, desktop computer, tablet, smartphone, wearable computer or other types of computing devices, such as a server, etc.

Generally, program modules, such as the program components 108, 110, 116, 120, $120_1, 120_2 \ldots 120_m$, 124, 126, and 128 may comprise routines, programs, objects, components, logic, data structures, and so on that perform particular tasks or implement particular abstract data types. The program components and hardware devices of the computing device may be implemented in one or more computer systems, where if they are implemented in multiple computer systems, then the computer systems may communicate over a network.

The program components 108, 110, 116, 120, $120_1, 120_2 \ldots 120_m$, 124, 126, and 128 may be accessed by the processor 102 from the memory 104 to execute.

Alternatively, some or all of the program components 108, 110, 116, 120, $120_1, 120_2, 120_m$, 124, 126, and 128 may be implemented in separate hardware devices, such as Application Specific Integrated Circuit (ASIC) hardware devices.

The functions described as performed by the program components 108, 110, 116, 120, $120_1, 120_2 \ldots 120_m$, 124, 126, and 128 may be implemented as program code in fewer program modules than shown or implemented as program code throughout a greater number of program modules than shown.

Certain of the components, such as the machine learning modules 126, $120_2 \ldots 120_m$ and natural language processor $120_1$ may use machine learning and deep learning algorithms, such as decision tree learning, association rule learning, neural network, inductive programming logic, support vector machines, Bayesian network, etc. For artificial neural network program implementations, each neural network may be trained using backward propagation to adjust weights and biases at nodes in a hidden layer to produce the computed output. In backward propagation used to train a neural network machine learning module, biases at nodes in the hidden layer are adjusted accordingly to produce the desired output retention period 300 based on specified confidence levels. Backward propagation may comprise an algorithm for supervised learning of artificial neural networks using gradient descent. Given an artificial neural network and an error function, the method may calculate the gradient of the error function with respect to the neural network's weights and biases.

In backward propagation used to train a neural network machine learning module, such as retention machine learning module 126, margin of errors are determined based on a difference of the calculated retention period 300 or an actual time the digital content 112 remained in the storage 114 before being deleted by the user to produce an adjusted retention period. Biases at nodes in the hidden layer are adjusted accordingly to decrease the margins of error in outputted retention periods 300.

The arrows shown in FIG. 1 between the components and objects in the memory 104 represent a data flow between the components.

The term "user" may refer to a person or computer process, such as a bot.

Figure 2:
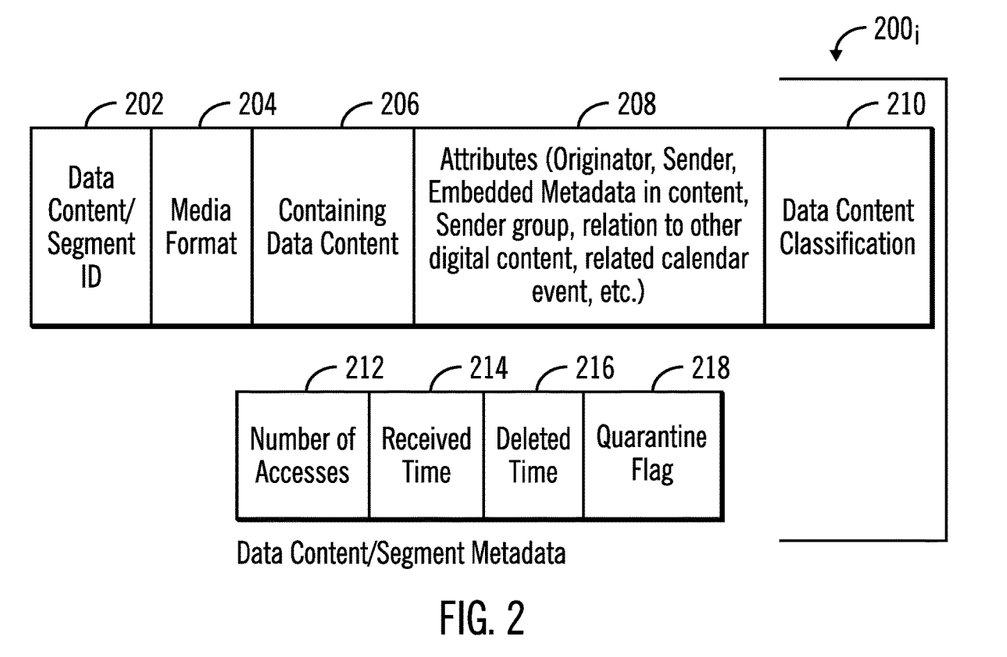
FIG. 2 illustrates an embodiment of data content metadata.

FIG. 2 illustrates an embodiment of data center metadata $200_i$ maintained for a digital content 112/segment $118_i$ and includes a data content/segment ID 202; a media format 204 of the content, e.g., text, audio, video, still image, etc.; containing data content 206 in which the segment 202 was included, e.g., a message to which the segment 202 was attached, a compressed container, etc.; attributes 208 of the content 202, including an originator creating the content, a sender of a transmission including the content 202, one or more data content classifications 210, such as classifications 122, $122_1$, $122_2$ ... $122_n$, generated by the ML analytic tool selection1 120 for the content 202; a number of accesses 212 indicating a number of times the user has accessed the digital content/segment 202 and provides a viewing pattern; a received 214 time the digital content/segment 202 was received; a deleted time 216 the digital content/segment 202 was deleted by a user or automatically; and a quarantine flag 218 indicating whether the digital content/segment 202 is in quarantine, which occurs after the quarantine period 304 for the digital content/segment 202 expires.

The metadata attributes 208 may include user priority ratings provided for digital content, additional identifying factors which determine content re-visiting and viewing patterns and identifying factors which determine user content deleting pattern. Attributes 208 may indicate related messages and digital content of which a particular digital content is a part, such as part of a group of messages forming a thread of messages based on an initial message.

Figure 3:
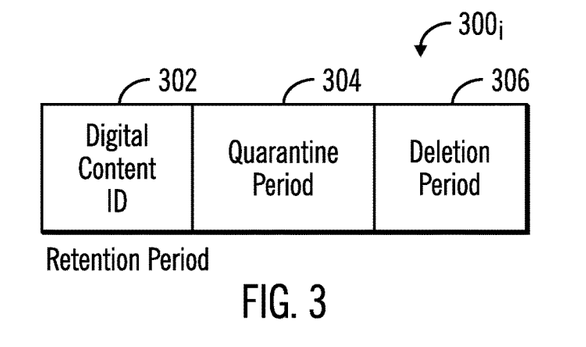
FIG. 3 illustrates an embodiment of an instance of a digital content retention period.

FIG. 3 illustrates an embodiment of a retention period $300_i$ generated by the retention MLM 126 for a digital content 112/segment $118_i$ and comprises a digital content/segment identifier 302 of the digital content 112/segment $118_i$ for which the retention period $300_i$ is generated, a generated quarantine period 304, and a generated deletion period 306. The entire retention period for a digital content 112/segment $118_i$ may comprise the sum of the quarantine period 304 and the deletion period 306.

Segments $118_1$ ... $118_n$ in the same containing data content 206 may be accessed and deleted at different times and have different retention periods $300_i$. Further, the retention period $300_i$ may indicate to archive certain digital content so it is never deleted. In further embodiments, the retention period $300_i$ may comprise a single time period indicating when the digital content is to be deleted after being retained for the retention period.

Figure 4:
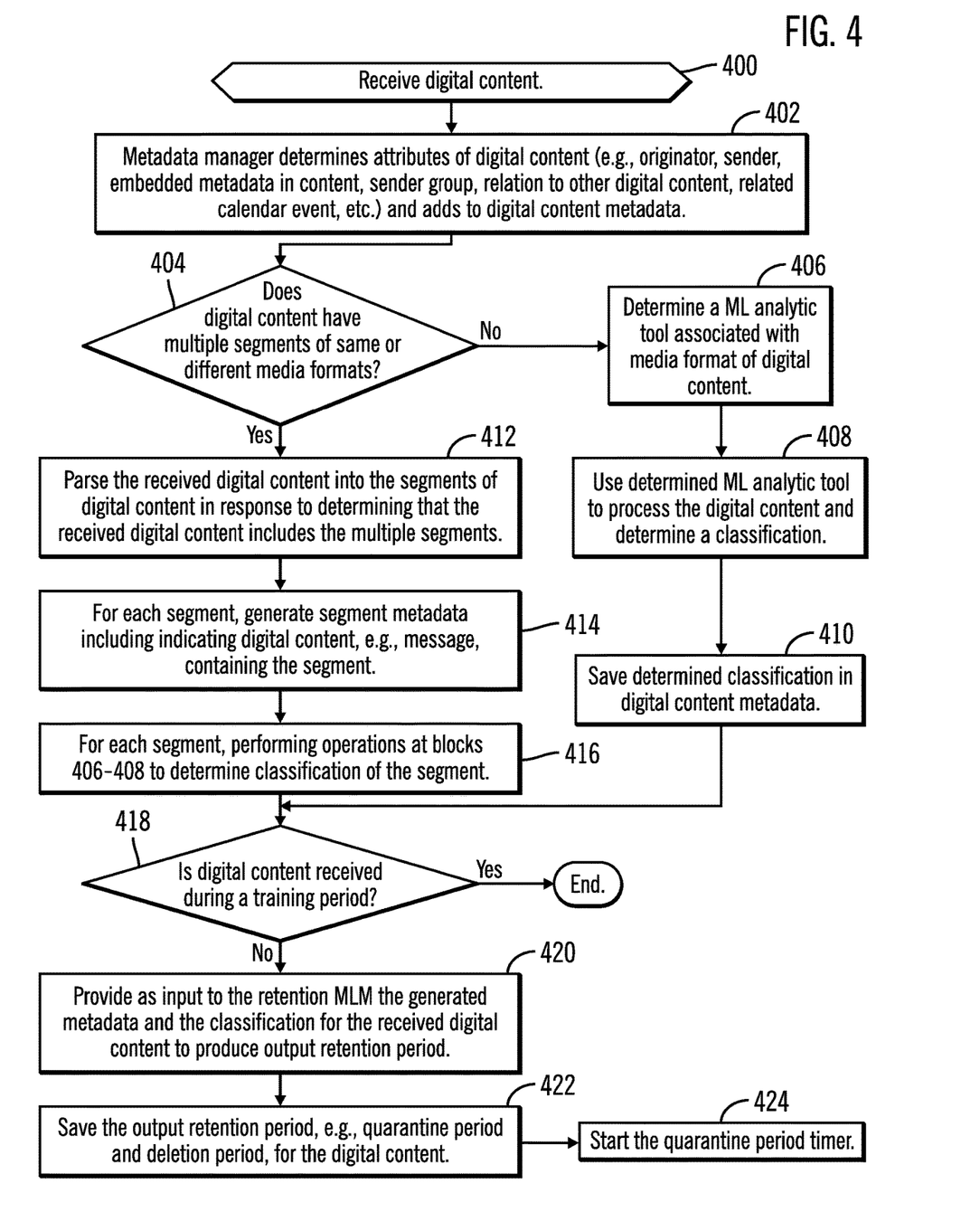
FIG. 4 illustrates an embodiment of operations to determine a retention period for received digital content.

FIG. 4 illustrates an embodiment of operations performed by the digital content manager 128, retention manager, content parser 116, metadata manager 124, and retention MLM 126 to determine a retention period $300_i$ for received digital content 112. Upon receiving (at block 400) digital content 112, such as in a message transmitted over the Internet or network, the metadata manager 124 determines (at block 402) attributes 208 of digital content (e.g., originator, sender, embedded metadata in content, sender group, relation to other digital content, related calendar event (e.g., national holiday, personal calendar event, such as birthday, social events, etc.) and adds to digital content metadata $200_i$ for the received digital content 112 as part of the attributes 208. The content parser 116 determines (at block 404) whether the digital content 112 has multiple segments of different or same media formats. If not, then the ML analytic tool selection 120 determines (at block 406) the ML analytic tool $120_i$ associated with the media format 204 of the received digital content 112. The determined ML analytic tool $120_i$ processes (at block 408) the digital content 112 and determines one or more classifications of the content of the digital content 112 and saves (at block 410) the determined classifications 210 in the metadata $200_i$.

If (at block 404) the digital content 112 has multiple segments $118_1$ ... $118_n$, then the content parser 116 parses (at block 412) the received digital content 112 into the segments $118_1$ ... $118_n$. For each segment $118_i$, the metadata manager 124 generates (at block 414) segment metadata $200_i$ including indicating the containing digital content 206, e.g., message, containing the segment $118_i$. For each segment $118_i$, the operations at blocks 416-418 are performed (at block 416) to determine the segment classification $122_i$ for the segment $118_i$.

From block 410 or 416, if (at block 418) the digital content 112 was not received during a training period for which data is being gathered to form a training set to train the retention MLM 126, then the retention manager 110 provides (at block 420) the generated metadata $200_i$ and the classification 210 for the received digital content 112/segment $118_i$ as input to the retention MLM 126 to output a calculated retention period $300_i$. The retention manager 110 saves (at block 422) the outputted retention period $300_i$ the retention MLM 126 outputs for the input in the metadata 210, which may include a quarantine period 304 and deletion period 306. The quarantine period timer 302 is started (at block 424) to move the digital content to the quarantine after expiration. If (at block 418) the digital content is received during the training period, then control ends.

With the embodiment of FIG. 4, machine learning modules and artificial intelligence are used to classify digital content and any segments in the digital content to provide with metadata on the digital content/segments to a retention MLM 126 to determine a retention period for which to retain the digital content. Because the retention MLM 126 is trained with data sets on how long files are retained and their MLM classification and metadata, the MLM 126 is configured to output a retention period to optimize the time the digital content is retained based on observed user access and deletion patterns.

Figure 5:
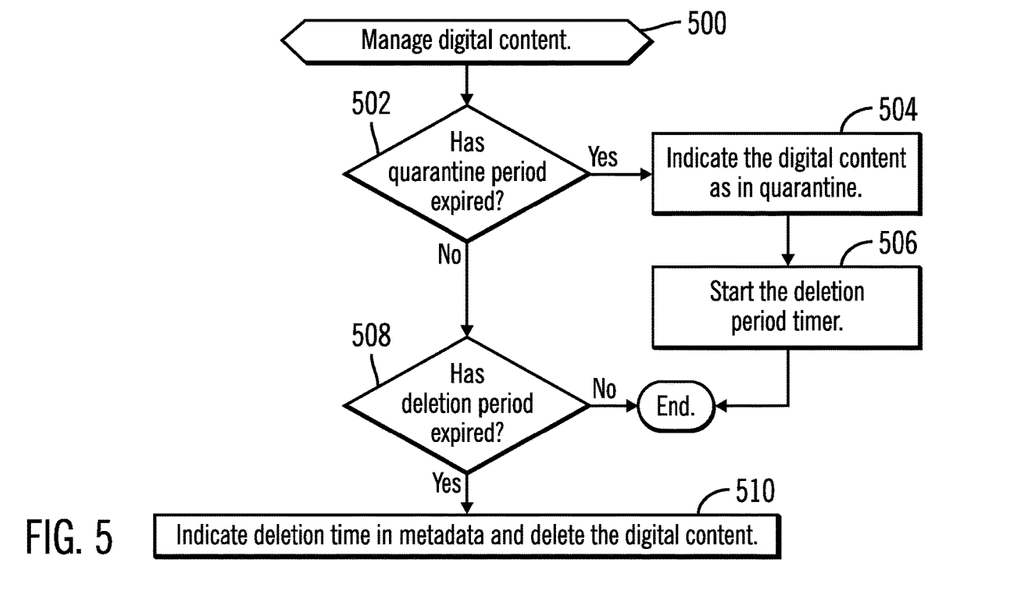
FIG. 5 illustrates an embodiment of operations to manage digital content with respect to a quarantine period and deletion period.

FIG. 5 illustrates an embodiment of operations performed by the digital content manager 128 to manage the digital content 112 and segments $118_i$ retained in the storage 114. If (at block 502) the quarantine period 304 for the digital content 112/segment $118_i$ has expired, then the quarantine flag 218 is set (at block 504) to indicate the digital content 112/segment $118_i$ is being quarantined until deleted. The deletion period timer 504 is started (at block 506) so that the digital content 112/segment $118_i$ is deleted from storage 114 after the deletion period timer 504 expires. If (at block 508) the deletion period 306 has expired, then the metadata $200_i$ for digital content 112/segment $118_i$ is updated to indicate the deletion time 216 and the content is then deleted from the storage 114.

With the embodiment of FIG. 5, digital content is added to a quarantine after a quarantine period has expired since the file was received. From quarantine, the file is deleted after the expiration of the deletion period 306. While the file is in quarantine, the user may access the file to avoid deletion, to allow the user to prevent deletion of digital content the user wants to retain longer.

Figure 6:
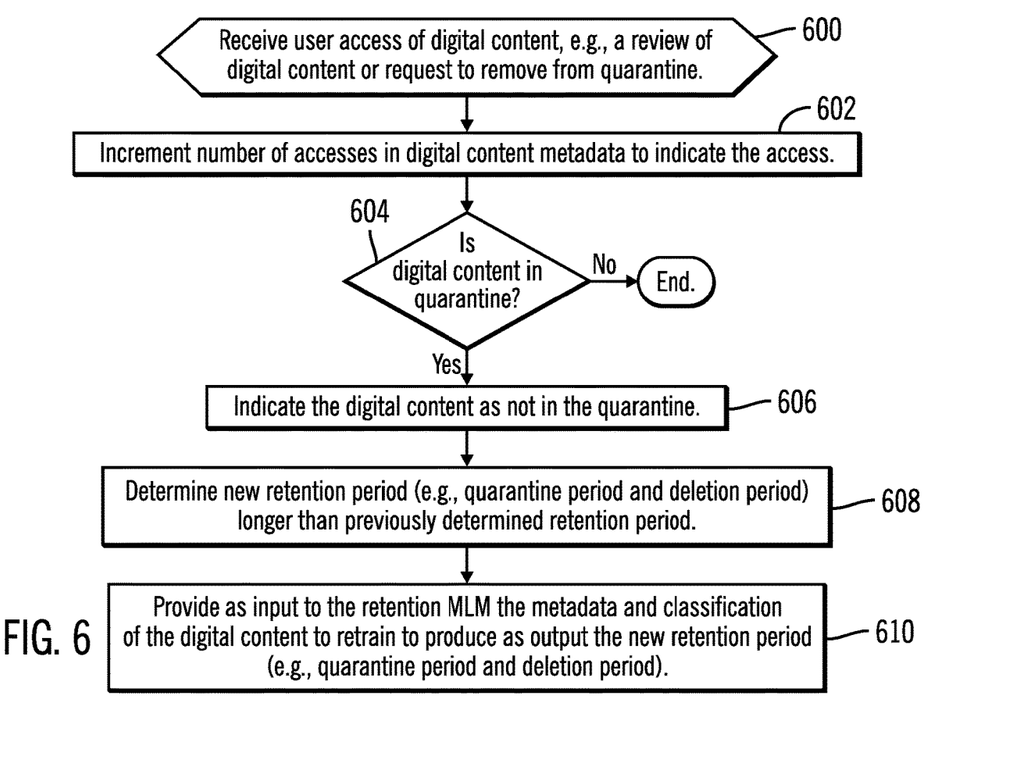
FIG. 6 illustrates an embodiment of operations to process user access to digital content, including a review of digital content and request to remove digital content from quarantine.

FIG. 6 illustrates an embodiment of operations performed by the digital content manager 128 and the retention MLM 126 to process a user request to access digital content 112/segment $118_i$. Upon receiving (at block 600) a user access of digital content 112/segment $118_i$, such as a read request or a request to remove digital content from the quarantine, the number of accesses 212 is incremented (at block 602) in the metadata $200_i$ for the accessed digital content 112/segment $118_i$, which may be accessed in or out of quarantine. If (at block 604) the accessed digital content 112/segment $118_i$ is in quarantine, as indicated by the quarantine flag 218, then the quarantine flag 218 is set to indicate not in quarantine. The digital content manager 128 may then determine (at block 608) a new retention period $300_i$ for the digital content 112/segment $118_i$, including quarantine period 304 and deletion period 306, longer than the previously determined retention period $300_i$ because the user has selected to remove the digital content from quarantine to retain for a longer period. For instance there may be a predetermined number of retention period levels, with quarantine and deletion periods, and the new retention period may follow the previously determined retention period in the set of predetermined retention period levels. The metadata $200_i$ and classification 210 for the accessed digital content 112/segment $118_i$ is provided (at block 610) to the retention MLM 126 to produce as output the determined new retention period $300_i$. If (at block 604) the digital content 112/segment $118_i$ is not in quarantine, then control ends.

With the embodiment of FIG. 6, upon accessing digital content, the number of accesses 212 is incremented and if the digital content is in quarantine, then a new longer retention period is determined to retrain the retention MLM 126 to adjust the retention MLM 126 to output the longer retention period for digital content having the attributes 208 and classification 210 of the accessed digital content being quarantined. The accessed digital content may then be retained for the new, longer, retention period.

Figure 7:
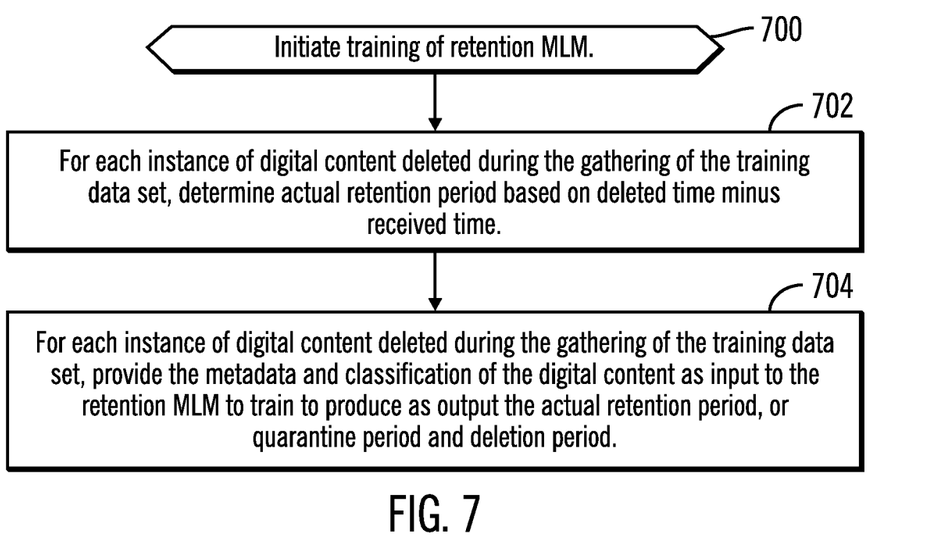
FIG. 7 illustrates an embodiment of operations to train a retention machine learning module (MLM).

FIG. 7 illustrates an embodiment of operations performed by the retention manager 110 and retention MLM 126 manager to initiate training of the retention MLM 126 based on a training data set gathered over a time period. During the building of the training data set, digital content metadata 200 is generated for received digital content and a deletion time is indicated to build the training set. Upon initiating (at block 700) training, for each instance of digital content 112/segment $118_i$ deleted during the period of gathering data for the training set, the retention manager 110 determines (at block 702) an actual retention period based on deleted time 216 minus the received time 214. For each instance of digital content 112/segment $118_i$ deleted during training period, the retention manager 110 provides (at block 704) the metadata $200_i$ and classification 210 of the digital content 112/segment $118_i$ as input to the retention MLM 126 to train to produce as output the actual retention period, or quarantine period and deletion period.

With the embodiment of FIG. 7, a training set of gathered information on deleted digital content/segments is provided to the retention MLM 126 to use to output an actual retention period. In this way, the retention MLM 126 is trained to output the retention period based on attributes 208 of the digital content 112/segment $118_i$ and the determined classification 210 of actual user access and deletion patterns of received digital content. This allows the retention MLM 126 to be optimized and retained for a duration during which the content is likely to be accessed. Content no longer likely to be accessed may be deleted from the storage 114 to save space on the storage 114, which may have limited space.

Figure 8:
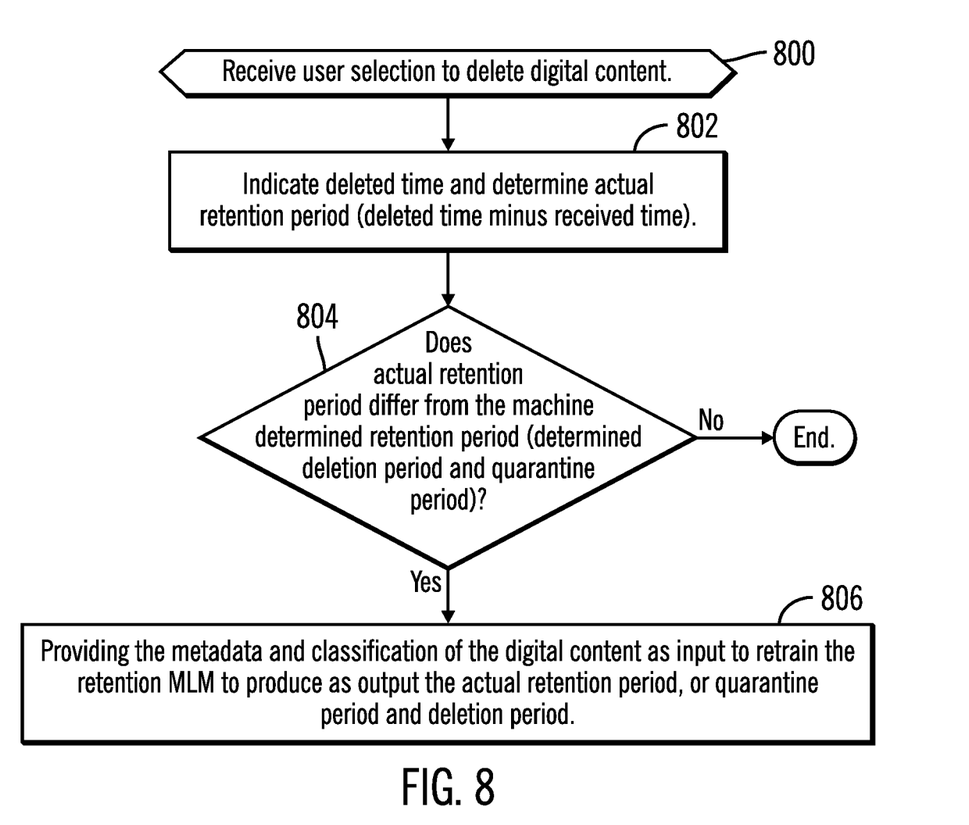
FIG. 8 illustrates an embodiment of operations to process a user deletion of digital media content.

FIG. 8 illustrates an embodiment of operations performed by the digital content manager 128 and retention MLM 126 to process a user request to delete digital content 112/segment $118_i$. In response to a request (at block 800) to delete digital content 112/segment $118_i$, the digital content manager 128 indicates (at block 802) the deleted time 216 in the metadata $200_i$ for the deleted digital content 112/segment $118_i$ and calculates an actual retention period comprising the deleted time 216 minus the received time 214. If (at block 804) the actual retention period differs from the machine determined retention period $300_i$, such as quarantine period 302 and deletion period 304, then the metadata $200_i$ and classification 210 is provided (at block 806) as input to retrain the retention MLM 126 to produce as output the actual retention period. If there is no substantial difference of the machine determined retention period $300_i$ and actual retention period, control ends without retraining the retention MLM 126 because it produced an accurate retention period.

In an alternative embodiment, the operations of FIG. 8 may be performed periodically to build retraining data sets for recently deleted digital content to periodically perform retraining of the retention MLM 126.

With the embodiment of FIG. 8, information on an actual retention period, determined when the file is deleted, may be used to determine whether to retrain the retention MLM 126 to adjust the output retention period to the actual retention period to retrain based on the metadata and classification of the deleted digital content. The embodiment of FIG. 8 allows self-adjustment of the retention MLM 126 during normal digital content management operations to reflect actual user deletion and access patterns for digital content having the digital content metadata.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
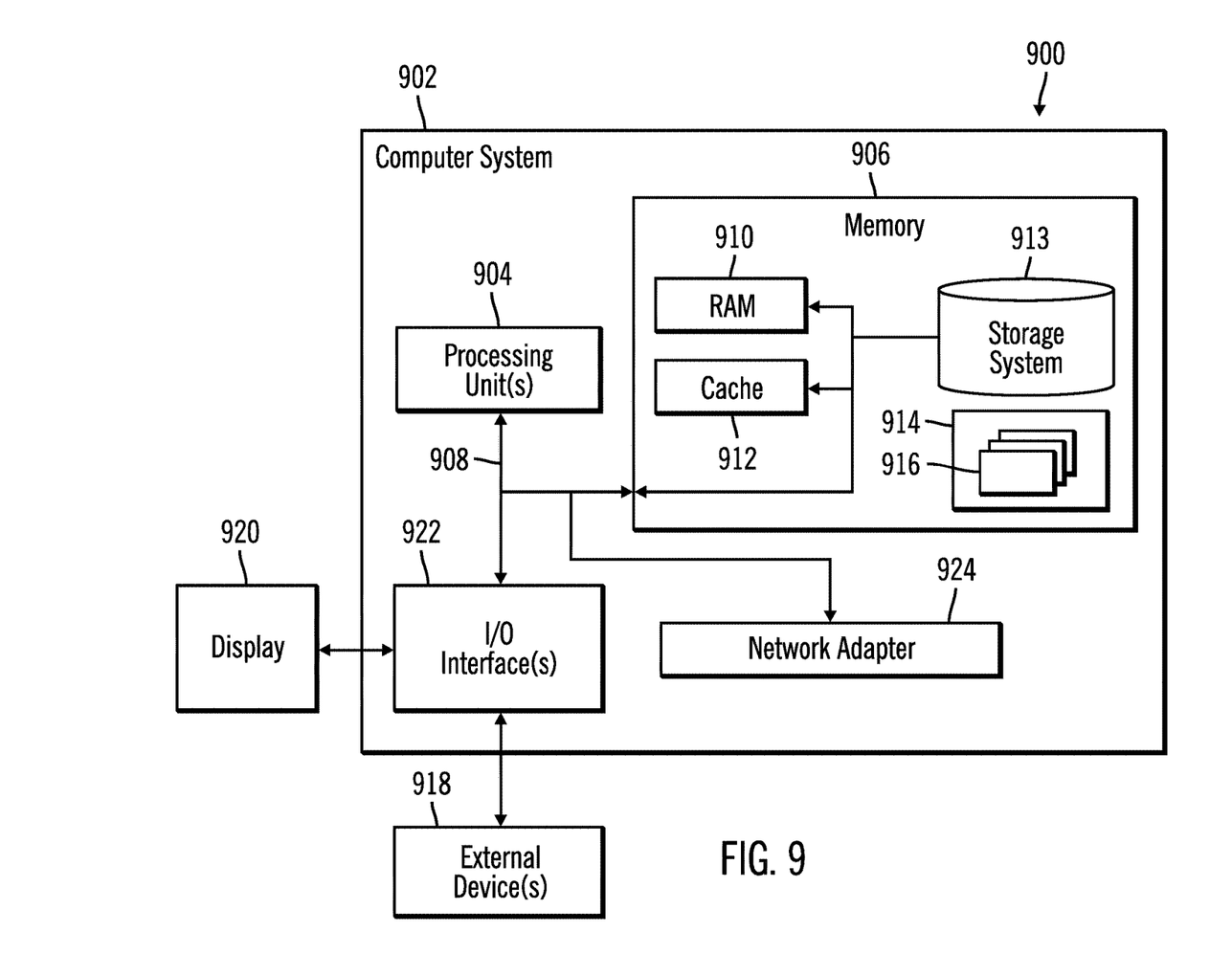
FIG. 9 illustrates a computing environment in which the components of FIG. 1 may be implemented.

The computational components of FIG. 1 of the computing device 100 may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The letter designators, such as i, m, and n are used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing digital content in storage used by a computing device, wherein the computer program product comprises a computer readable storage medium having program instructions embodied therewith that when executed cause operations, the operations comprising:

determining whether an instance of digital content includes segments, comprising separate instances of the digital content;

parsing the digital content into the segments in response to determining that the digital content includes the segments;

generating metadata for the segments, including access patterns of the segments by a user of the computing device and data attributes of the segments;

determining actual retention periods for the segments based on time during which is the segments are retained in the storage;

training a machine learning module with input comprising the access patterns and the data attributes for the segments to produce the determined actual retention periods for the segments;

after the training the machine learning module, providing input for the segments comprising access patterns and data attributes for the segments, to the machine learning module to produce output retention periods for the segments; and using the output retention periods to determine when to delete the segments from the storage.

2. The computer program product of claim 1, wherein the data attributes of the segments comprise at least one of: an originator of the segments; a sender that transmitted the segments to the computing device in a message; metadata embedded in the segments when transmitted to the computing device; a classification of the segments determined by a classification program; a group to which the sender belongs;

relation of the segments to previously received digital content; and a related calendar event.

3. The computer program product of claim 1, wherein the digital content comprises a message with attached files, and wherein the segments comprise the message and the attached files, wherein the machine learning module produces different retention periods for the segments.

4. The computer program product of claim 3, wherein the operations further comprise:
performing natural language processing (NLP) of content of the message to determine a message classification based on the NLP processing of the content of the message, wherein the message classification is provided as input to train the machine learning module to produce an output retention period for a segment comprising the message.

5. The computer program product of claim 1, wherein the operations further comprise:
for a segment of the digital content, determining a machine learning analytic tool to generate a segment classification of content of the segment based on a media format of content in the segment, wherein the metadata generated for the segment and inputted to the machine learning module includes a segment classification determined by the machine learning analytic tool determined for the segment.

6. The computer program product of claim 1, wherein an output retention period of the output retention periods comprises a quarantine period and a deletion period for the output retention period of a segment of the segments, wherein the segment is indicated in quarantine after expiration of the quarantine period, wherein the segment in the quarantine is deleted from the storage in response to expiration of the deletion period started when the segment is indicated in the quarantine, and wherein the training the machine learning module comprises training the machine learning module to produce as output the quarantine period and the deletion period based on the input for the segment.

7. The computer program product of claim 6, wherein the operations further comprise:
receiving user selection to remove the segment from the quarantine to retain in storage;
indicating the segment to remove from the quarantine as not in the quarantine;
determining a new retention period longer than the output retention period determined for the segment to remove from the quarantine; and
providing input, comprising metadata determined from the segment to remove from the quarantine, to the machine learning module to retrain the machine learning module to produce as output the new retention period.

8. The computer program product of claim 1, wherein the operations further comprise:
receiving selection to delete a segment of the segments for which a retention period was determined by the machine learning module;
determining whether an actual retention period of the deleted segment based on when the segment was deleted differs from an output retention period of the deleted segment; and
retraining the machine learning module using the metadata for the deleted segment as input to produce as output the actual retention period.

9. A system coupled to a storage for managing digital content in storage used by a computing device, comprising:
a processor; and
a computer readable storage medium having program instructions that when executed by the processor cause operations, the operations comprising:
determining whether an instance of digital content includes segments, comprising separate instances of the digital content;
parsing the digital content into the segments in response to determining that the digital content includes the segments;
generating metadata for the segments, including wherein the metadata for one of the segments includes access patterns of the segments by a user of the computing device and data attributes of the segments;
determining actual retention periods for the segments based on time during which the segment are retained in the storage;
training a machine learning module with input comprising the access patterns and the data attributes for the segment to produce the determined actual retention periods for the segments;
after the training the machine learning module, providing input, for the segments, comprising access patterns and data attributes for the segments, to the machine learning module to produce output retention periods for the segments; and
using the output retention periods to determine when to delete the segments from the storage.

10. The system of claim 9, wherein the digital content comprises a message with attached files, and wherein the segments comprise the message and the attached files, wherein the machine learning module produces different retention periods for the segments.

11. The system of claim 9, wherein the operations further comprise:
for a segment of the digital content, determining a machine learning analytic tool to generate a segment classification of content of the segment based on a media format of content in the segment, wherein the metadata generated for the segment and inputted to the machine learning module includes a segment classification determined by the machine learning analytic tool determined for the segment.

12. The system of claim 10, wherein an output retention period of the output retention periods comprises a quarantine period and a deletion period for the output retention period of a segment of the segments, wherein the segmented is indicated in quarantine after expiration of the quarantine period, wherein the segment in the quarantine is deleted from the storage in response to expiration of the deletion period started when the segment is indicated in the quarantine, and wherein the training the machine learning module comprises training the machine learning module to produce as output the quarantine period and the deletion period based on the input for the segment.

13. The system of claim 9, wherein the operations further comprise:
receiving selection to delete a segment of the segments for which a retention period was determined by the machine learning module;
determining whether an actual retention period of the deleted segment based on when the segment was deleted differs from an output retention period of the deleted segment; and
retraining the machine learning module using the metadata for the deleted segment as input to produce as output the actual retention period.

14. A computer implemented method for managing digital content in storage used by a computing device, comprising:
- determining whether an instance of digital content includes segments, comprising separate instances of the digital content;
- parsing the digital content into the segments in response to determining that the digital content includes the segments;
- generating metadata for the segments, including access patterns of the segments by a user of the computing device and data attributes of the segments;
- determining actual retention periods for the segments based on time during which the segments are retained in the storage;
- training a machine learning module with input comprising the access patterns and the data attributes for the segments to produce the determined actual retention periods for the segments;
- after the training the machine learning module, providing input for the segments, comprising access patterns and data attributes for the segments, to the machine learning module to produce output retention periods for the segments; and
- using the output retention periods to determine when to delete the segments from the storage.

15. The method of claim 14, wherein the digital content comprises a message with attached files, and wherein the segments comprise the message and the attached files, wherein the machine learning module produces different retention periods for the segments.

16. The method of claim 14, further comprising:
- for a segment of the digital content, determining a machine learning analytic tool to generate a segment classification of content of the segment based on a media format of content in the segment, wherein the metadata generated for the segment and inputted to the machine learning module includes a segment classification determined by the machine learning analytic tool determined for the segment.

17. The method of claim 14, wherein an output retention period of the output retention periods comprises a quarantine period and a deletion period for the output retention period of a segment of the segments, wherein the segment is indicated in quarantine after expiration of the quarantine period, wherein the segment in the quarantine is deleted from the storage in response to expiration of the deletion period started when the segment is indicated in the quarantine, and wherein the training the machine learning module comprises training the machine learning module to produce as output the quarantine period and the deletion period based on the input for the segment.

* * * * *

UNITED STATES PATENT AND TRADEMARK OFFICE
CERTIFICATE OF CORRECTION

PATENT NO. : 11,604,760 B2
APPLICATION NO. : 17/203730
DATED : March 14, 2023
INVENTOR(S) : Partho Ghosh et al.

It is certified that error appears in the above-identified patent and that said Letters Patent is hereby corrected as shown below:

In the Claims

Claim 9, Column 14, Line 10, please remove [[including]] after "generating metadata for the segments,"

Signed and Sealed this
Eighteenth Day of April, 2023

Katherine Kelly Vidal
*Director of the United States Patent and Trademark Office*